US011902099B2

(12) United States Patent
Hemige et al.

(10) Patent No.: US 11,902,099 B2
(45) Date of Patent: Feb. 13, 2024

(54) METHODS AND SYSTEMS FOR AUTOMATICALLY BUILDING AN INTERNET PROTOCOL (IP) NETWORK (71) Applicant: Nile Global, Inc., San Jose, CA (US)

(72) Inventors: Venu Hemige, San Ramon, CA (US); Promode Nedungadi, San Jose, CA (US); Suresh Katukam, Milpitas, CA (US)

(73) Assignee: NILE GLOBAL, INC., San Jose, CA (US)

( * ) Notice: Subject to any disclaimer, the term of this patent is extended or adjusted under 35 U.S.C. 154(b) by 0 days.

(21) Appl. No.: 17/724,256

(22) Filed: Apr. 19, 2022

(65) Prior Publication Data
US 2023/0336426 A1    Oct. 19, 2023

(51) Int. Cl.
H04L 41/12    (2022.01)
H04L 61/5014    (2022.01)

(52) U.S. Cl.
CPC .......... H04L 41/12 (2013.01); H04L 61/5014 (2022.05)

(58) Field of Classification Search
CPC ..................... H04L 41/12; H04L 61/5014
See application file for complete search history.

(56) References Cited

U.S. PATENT DOCUMENTS

| 7,286,537 | B2 | 10/2007 | Roh | |
| 7,974,311 | B2 | 7/2011 | Vesterinen et al. | |
| 10,630,543 | B1* | 4/2020 | Wei | H04W 4/70 |
| 2013/0018993 | A1* | 1/2013 | Hui | H04L 41/0803 709/220 |
| 2018/0183753 | A1* | 6/2018 | Vemulakonda | H04L 61/103 |
| 2018/0287873 | A1* | 10/2018 | Peng | H04L 41/0806 |
| 2021/0184930 | A1 | 6/2021 | Mutnuru et al. | |

* cited by examiner

Primary Examiner — Abdulkader M Alriyashi
(74) Attorney, Agent, or Firm — Loza & Loza, LLP (57) ABSTRACT Embodiments of a device and method are disclosed. In an embodiment, a method for automatically building an internet protocol (IP) network involves at a first network element, obtaining a first IP address from a Dynamic Host Configuration Protocol (DHCP) server, at the first network element, receiving a DHCP request from a second network element on an unnumbered interface of the first network element, and at the first network element, forwarding the DHCP request from the second network element to the DHCP server using the first IP address as a relay IP address.

17 Claims, 9 Drawing Sheets

METHODS AND SYSTEMS FOR AUTOMATICALLY BUILDING AN INTERNET PROTOCOL (IP) NETWORK

BACKGROUND

Growing adoption of networks, such as, enterprise campus networks allows enterprises to increase network coverage and functionality. For example, due to the dynamic nature of the business and campuses, switches/routers, gateways, access points (APs), and/or client devices, such as, laptops, printers, servers, security cameras, and/or other connected Internet of things (IoT) devices are typically interconnected in a network. However, automatically building an Internet Protocol (IP) network between devices (e.g., switches/routers or other devices) can be complicated and challenging because IP address management, use of IP address space, and device configuration in an IP network can be complex and difficult to implement. Therefore, there is a need for network technology that can automatically build an IP network between network devices with effective IP address management, efficient use of IP address space, and reliable device configuration (e.g., zero-configuration (zero-config)).

SUMMARY

Embodiments of a device and method are disclosed. In an embodiment, a method for automatically building an internet protocol (IP) network involves at a first network element, obtaining a first IP address from a Dynamic Host Configuration Protocol (DHCP) server, at the first network element, receiving a DHCP request from a second network element on an unnumbered interface of the first network element, and at the first network element, forwarding the DHCP request from the second network element to the DHCP server using the first IP address as a relay IP address. Other embodiments are also described.

In an embodiment, the method of claim 1 further includes at the first network element, receiving a DHCP response from the DHCP server, wherein the DHCP response contains a second IP address of the second network element, and wherein the first and second network elements are in the same subnet and at the first network element, forwarding the DHCP response from the DHCP server to the second network element through the unnumbered interface of the first network element.

In an embodiment, the first and second IP addresses have an identical subnet mask.

In an embodiment, the method further includes establishing peer routing between the first network element and the second network element using a routing protocol after the second network element acquires the second IP address based on the DHCP response.

In an embodiment, the routing protocol includes an Open Shortest Path First (OSPF) protocol.

In an embodiment, at the first network element, obtaining the first IP address from the DHCP server includes at the first network element, recording a server IP address of the DHCP server.

In an embodiment, the first and second network elements are switches or routers.

In an embodiment, the first and second network elements include at least one distribution switch (DS).

In an embodiment, the first and second network elements include at least one access switch (AS).

In an embodiment, the first and second network elements includes a distribution switch (DS) and an access switch (AS).

In an embodiment, the first and second network elements include at least one wireless access point (AP).

In an embodiment, a method for automatically building an IP network involves at a first switch or router, obtaining a first IP address from a Dynamic Host Configuration Protocol (DHCP) server, at the first switch or router, receiving a DHCP request from a second switch or router on an unnumbered interface of the first switch or router, at the first switch or router, forwarding the DHCP request from the second switch or router to the DHCP server using the first IP address as a relay IP address, at the first switch or router, receiving a DHCP response from the DHCP server, where the DHCP response contains a second IP address of the second switch or router, and where the first and second switches or routers are in the same subnet, and at the first switch or router, forwarding the DHCP response from the DHCP server to the second switch or router through the unnumbered interface of the first switch or router.

In an embodiment, the method further includes establishing peer routing between the first switch or router and the second switch or router using a routing protocol after the second switch or router acquires the second IP address based on the DHCP response.

In an embodiment, the routing protocol include an OSPF protocol.

In an embodiment, at the first switch or router, obtaining the first IP address from the DHCP server includes at the first switch or router, recording a server IP address of the DHCP server.

In an embodiment, the first and second switches or routers include at least one DS.

In an embodiment, the first and second switches or routers include at least one AS.

In an embodiment, the first and second switches or routers include a DS and an AS.

In an embodiment, a network element includes memory and one or more processors configured to obtain a first IP address from a DHCP server, receive a DHCP request from a second network element on an unnumbered interface of the network element, and forward the DHCP request from the second network element to the DHCP server using the first IP address as a relay IP address.

In an embodiment, the one or more processors are further configured to receive a DHCP response from the DHCP server, where the DHCP response contains a second IP address of the second network element, and forward the DHCP response from the DHCP server to the second network element through the unnumbered interface of the network element.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
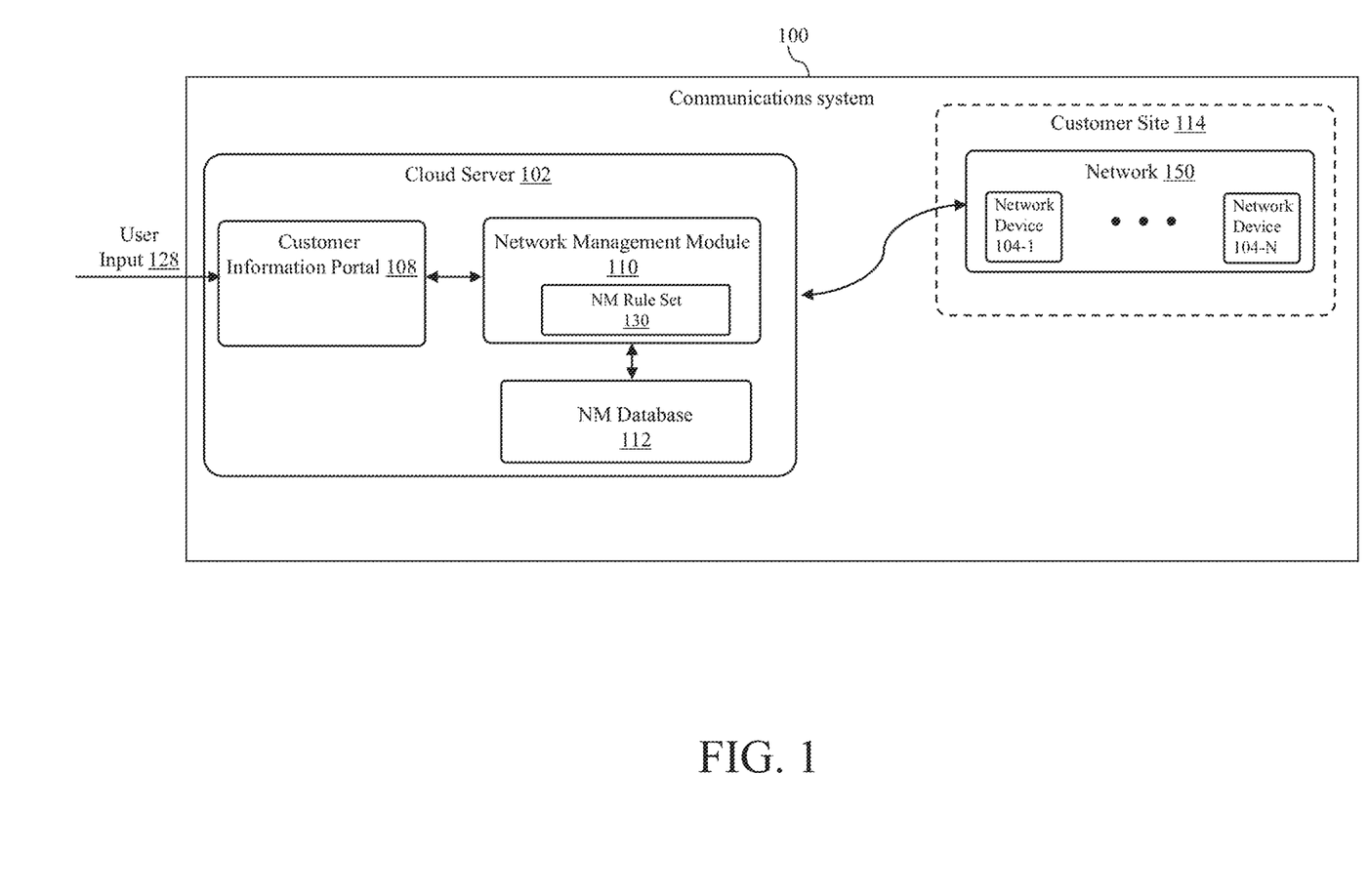
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site 114 (e.g., to the deployed network 150 located at the customer site 114). The cloud server may be configured to facilitate or perform a network management service (e.g., a network building or formation service, such as, an IP network building or formation service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM 110, and a network management (NM) database 112 configured to store NM data. The NMM, the customer information portal, and/or the NM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM, more than one customer information portal, and/or more than one NM database. In another example, although the NMM, the customer information portal, and the NM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM 110 is configured to facilitate or perform a network management (NM) service (e.g., a network building or formation service, such as, an IP network building or formation service) to network devices (e.g., the deployed network 150) at the customer site 114, for example, using an NM rule set 130. The NM rule set 130 may include one or more NM rules (e.g., at least one network building or formation rule, such as, at least one IP network building or formation rule) for network devices at the customer site 114, for example, for performing an NM service (e.g., a network building or formation service, such as, an IP network building or formation service) to network devices at the customer site 114. In some embodiments, the NMM 110 is configured to generate and/or transmit at least one alert (e.g., a device outage alert, a network throughput alert, and/or a network security alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NM database 112 is configured to store NM data (e.g., security data) for a network deployed and/or to be deployed at the customer site (e.g., a list of network devices deployed or to be deployed at the customer site). In some embodiments, the NM database 112 is configured to store the at least one NM alert. Because the NMM can facilitate or perform an NM service (e.g., a network building or formation service, such as, an IP network building or formation service) for network devices at the customer site, network operation efficiency can be improved. In addition, because the NMM can facilitate or perform a network service or operation for network devices at the customer site, an administrator or a customer can be notified of device and/or network conditions or outages. Consequently, device and/or network outage, low performance time, or a security breach period can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NM service for the customer site 114, such as one or more specific requirements or restrictions.

In the embodiment depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface that supports at least one wired or wireless communications protocol, and/or at least one antenna. For example, at least one of the network devices 104-1, . . . , 104-N is compatible with an Institute of Electrical and Electronics Engineers (IEEE) 802.3 protocol and/or one or more wireless local area network (WLAN) communications protocols, such as an IEEE 802.11 protocol, and/or a short-range communications protocol, such as Bluetooth. In some embodiments, at least one of the network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one head end (HE) or gateway, at least one router or switch (e.g., a distribution switch (DS) or distribution layer switch that functions as a bridge between a core layer switch and an access layer switch and/or an access switch (AS) that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N is a wireless station (STA) that wirelessly connects to a wireless AP. For example, at least one of the network devices 104-1, . . . , 104-N may be a laptop, a desktop personal computer (PC), a mobile phone, or other wireless device that supports at least one WLAN communications protocol (e.g., an IEEE 802.11 protocol).

Figure 2:
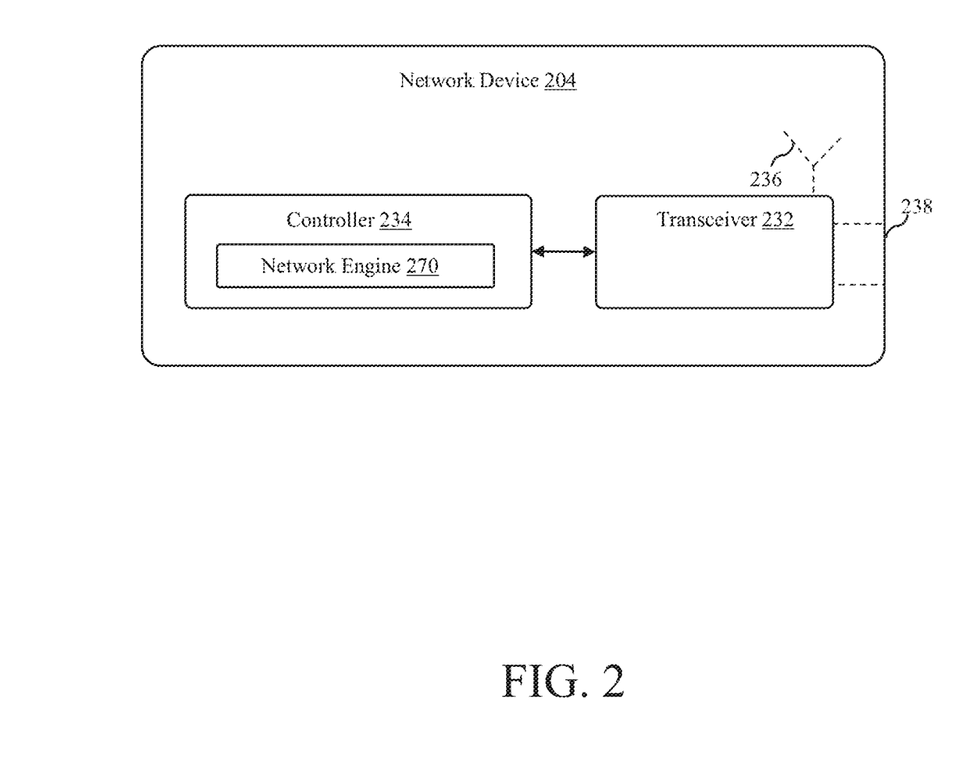
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a gateway or headend (HE), a router or switch (e.g., a distribution switch (DS) or an access switch (AS)), a wireless access point (AP), a sensor, or a user device, such as, a laptop, a desktop personal computer (PC), or a mobile phone. In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204, such as, security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

In the embodiment depicted in FIG. 2, the network device 204 (e.g., the controller 234) includes a network engine 270 configured to execute one or more communications protocols. In some embodiments, the network engine 470 is configured to execute Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the network engine 270 includes or is implemented using a processor (e.g., a microcontroller, a DSP, and/or a CPU) configured to execute one or more communications protocols (e.g., Layer 3 (L3) protocols), and memory that may store information (e.g., an OS) for the processor. For example, the controller 234 is implemented using a processor and memory, and the network engine 270 is a software module that executes in the processor. In some embodiments, the controller 234 (e.g., the network engine 270) includes a storage device (e.g., one or more hard disks, flash memory modules, solid state disks, and/or optical disks) that contains or stores predefined information (e.g., a predefined security certificate), which may be placed or embedded into the network device 204 during a manufacturing process.

Figure 3:
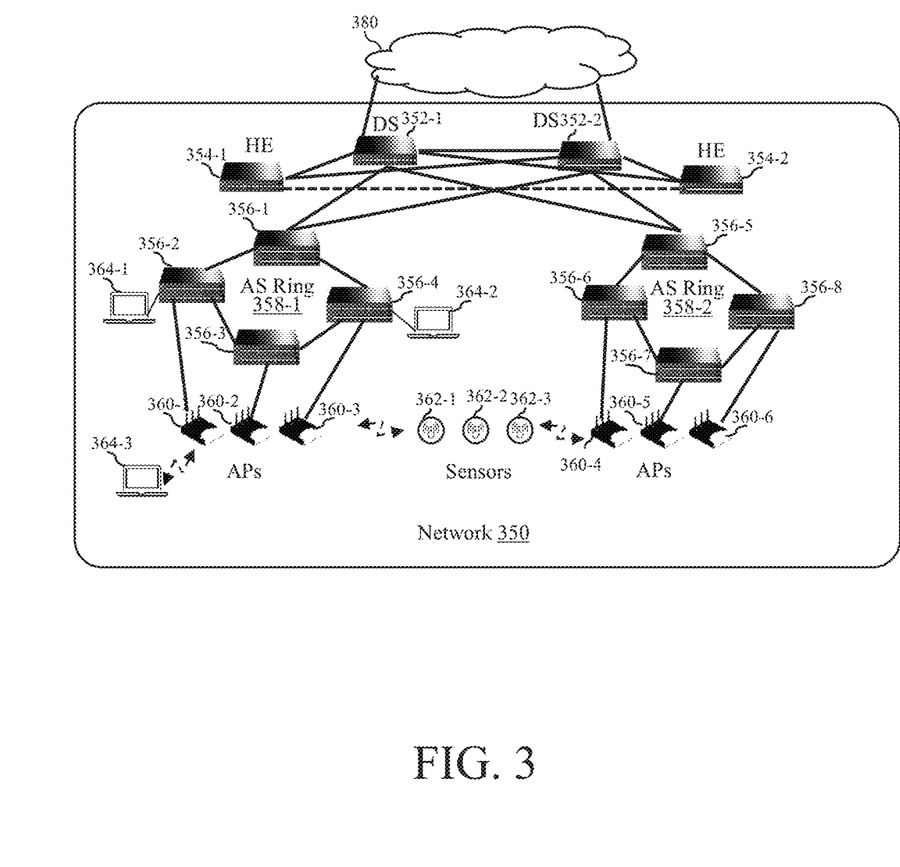
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes one or more routers or switches (e.g., a pair of distribution switches (DSs) or distribution layer switches 352-1, 352-2 that are aggregation switches functioning as a bridge between core layer switches and access layer switches and a number of access switches (ASs) 356-1, 356-2, 356-3, 356-4, 356-5, 356-6, 356-7, 356-8 connected in rings 358-1, 358-2 that directly interact with lower level devices (e.g., wireless APs)), a pair of head ends (HEs) or gateways 354-1, 354-2, a number of wireless APs 360-1, 360-2, 360-3, 360-4, 360-5, 360-6 connected to the ASs, a number of wireless sensors 362-1, 362-2, 362-3 that wirelessly connect to the wireless APs, and a number of network devices 364-1, 364-2, 364-3 that are connected to the ASs 356-2, 356-4, and the wireless AP 360-1 through cables or wires, for example, Ethernet cables, or wirelessly. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and/or the network devices 364-1, 364-2, 364-3 may be an embodiment of the network device 204 depicted in FIG. 2. The network devices 364-1, 364-2, 364-3 may be wired and/or wireless devices, for example, laptops, desktop PCs, or other wired devices. In some embodiments, each of the network devices 364-1, 364-2, 364-3 includes at least one wired transceiver (e.g., the transceiver 232) and at least one network port (e.g., the network port 238) that is used to connect to another communication device through at least one cable or wire, for example, at least one Ethernet cable. In some embodiments, as a wired device, each of the network devices 364-1, 364-2, 364-3 includes a wireless transceiver and at least one antenna (e.g., the antenna 236). In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the NM module 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. A wired communications device of a customer (e.g., the network device 364-1, 364-2, or 364-3) can connect to the NSB on an L3 interface in a secured manner. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, more than three network devices, and/or less than three network devices. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, and the sensor(s) in the network 350 varies.

Figure 4:
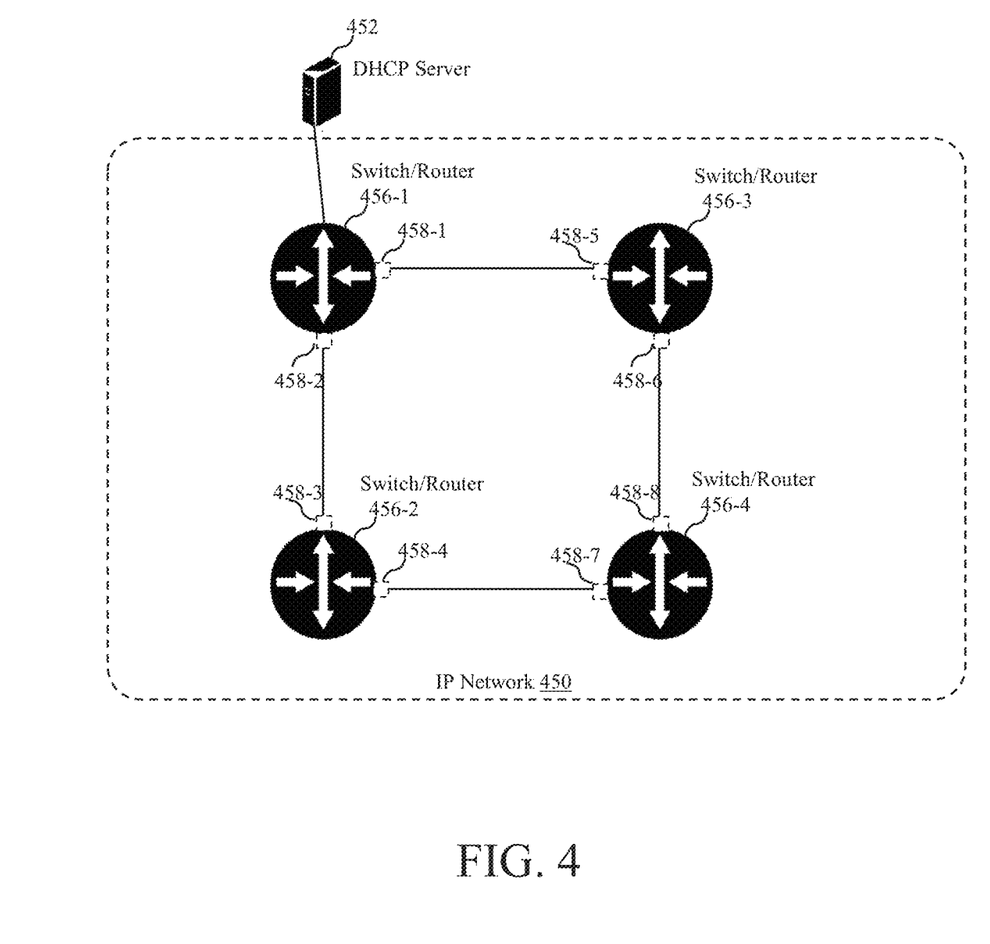
FIG. 4 depicts an IP network that can be included in the communications system depicted in FIG. 1.

FIG. 4 depicts an IP network 450 that can be included in the communications system 100 depicted in FIG. 1. The IP network 450 depicted in FIG. 4 may be an embodiment or a component of the network 150 depicted in FIG. 1 and/or the network 350 depicted in FIG. 3. However, the network 150 depicted in FIG. 1 and/or the network 350 depicted in FIG. 3 is not limited to the embodiment depicted in FIG. 4. In the embodiment depicted in FIG. 4, the IP network 450 includes four switches or routers 456-1, 456-2, 456-3, 456-4 that are coupled to a Dynamic Host Configuration Protocol (DHCP) server 452, which can be connected to an external network, such as, the Internet. The switches or routers 456-1, 456-2, 456-3, 456-4 may be embodiments of the DSs 352-1, 352-2 and the ASs 356-1, 356-2, 356-3, 356-4, 356-5, 356-6, 356-7, 356-8 depicted in FIG. 3. The DHCP server 452 may be an embodiment or a component of the DSs 352-1, 352-2. However, the DSs 352-1, 352-2 and the ASs 356-1, 356-2, 356-3, 356-4, 356-5, 356-6, 356-7, 356-8 depicted in FIG. 3 are not limited to the embodiment depicted in FIG. 4. The DHCP server 452 may be implemented in hardware (e.g., circuits), software, firmware, or a combination thereof. In some embodiments, the DHCP server 452 includes or is implemented using a processor (e.g., a microcontroller, a DSP, and/or a CPU) configured to execute DHCP functions, and memory that may store information (e.g., an OS) for the processor. For example, the DHCP server 452 is a software module that executes in a processor. Although the IP network 450 is shown in FIG. 4 with certain topology, in other embodiments, the IP network 450 has a different topology. For example, the IP network 450 may have a ring topology, a full-mesh topology, a star topology or a combination of the above. Although the IP network 450 is shown in FIG. 4 with switches or routers, in other embodiments, the IP network 450 includes other types of network elements. For example, the IP network 450 may include access points (APs), servers, and other entities that participate in automatically acquiring IP addresses from the same subnet pool and may not participate in route propagation.

In the embodiment depicted in FIG. 4, each of the switches or routers 456-1, 456-2, 456-3, 456-4 is connected to other switch or router through an unnumbered interface 458-1, 458-2, 458-3, 458-4, 458-5, 458-6, 458-7, or 458-8. The unnumbered interfaces 458-1, 458-2, 458-3, 458-4, 458-5, 458-6, 458-7, 458-8 may be physical network ports or logical or virtual representation of physical network ports. In some embodiments, each of the unnumbered interfaces 458-1, 458-2, 458-3, 458-4, 458-5, 458-6, 458-7, 458-8 does not have a specific IP address assigned to the unnumbered interface. An unnumbered logical or virtual interface can be set up using an IP unnumbered command, which enables IP processing on the unnumbered logical or virtual interface without assigning an explicit IP address to the unnumbered logical or virtual interface. In some embodiments, an IP unnumbered interface allows IP packets to be processed without configuring a unique IP address on the IP unnumbered interface, for example, by borrowing an IP address from another interface (e.g., a numbed interface with a specific assigned IP address). The IP network 450 is built between the switches or routers 456-1, 456-2, 456-3, 456-4 automatically. In the embodiment depicted in FIG. 4, each of the switches or routers 456-1, 456-2, 456-3, 456-4 automatically determines its unique IP address by allocating or requesting an IP address from the DHCP server 452. Each of the switches or routers 456-1, 456-2, 456-3, 456-4 only needs a single IP address for any network element to reach it. In the embodiment depicted in FIG. 4, the IP network 450 has a single subnet. For example, the IP addresses of the switches or routers 456-1, 456-2, 456-3, 456-4 have the same subnet mask. Consequently, IP address management for the IP network 450 is simplified. In addition, efficient use of IP address space is achieved, compared to typical routers that are configured with at least a/31 subnet mask on each link without unnumbered interfaces. Further, the IP network 450 is setup without manual configuration on each router interface and router-identification (ID). Consequently, zero-configuration of the IP network 450 can be achieved. In the embodiment depicted in FIG. 4, the DHCP server 452 expects all hosts requesting for an IP address from a given subnet to reside in the same LAN segment, while each LAN segment belongs to a different subnet. However, in the IP network 450, the switches or routers 456-1, 456-2, 456-3, 456-4 may not belong to the same LAN segment. The switches or routers 456-1, 456-2, 456-3, 456-4 appear as hosts belonging to the same segment to the DHCP server 452, as described in the operation below. Typically, DHCP is not designed to work over unnumbered interfaces. In the embodiment depicted in FIG. 4, because the DHCP server 452 and a corresponding DHCP client are not in the same LAN segment, a DHCP relay agent can act as the proxy between a DHCP client and the DHCP server is set up in the same LAN segment as the DHCP client. For example, a DHCP relay agent is set up in each of the switches or routers 456-1, 456-2, 456-3 to relay DHCP messages between the DHCP server 452 and another switch or router.

An example network building operation of the IP network 450 is described as follows. Because the switch or router 456-1 is closest to the DHCP server 452, the switch or router 456-1 knows the route to the DHCP server and is designated as the bootstrap router. In some embodiments, the switch or router 456-1 hosts a DHCP service on a locally defined interface and acquires its own IP address using the DHCP service. The other switches or routers 456-2, 456-3, 456-4 do not have such configuration. A router may have multiple interfaces, and each router discovers the list of interfaces on which they are connected to other routers. If a switch or router does not yet know its own IP address, the switch or router sends out DHCP requests on each of the interfaces on which the switch or router is connected to another switch or router. For example, the switch or router 456-2 sends DHCP requests on the unnumbered interfaces 458-3, 458-4 towards the switch or router 456-1 and the switch or router 456-4, respectively. The switch or router 456-3 sends DHCP requests on the unnumbered interfaces 458-5, 458-6 towards the switch or router 456-1 and the switch or router 456-4, respectively. The switch or router 456-4 sends DHCP requests on the unnumbered interfaces 458-7, 458-8 towards the switch or router 456-2 and the switch or router 456-3, respectively. When a switch or router receives a DHCP request on one of its unnumbered interfaces and the switch or router knows its own IP address already, the switch or router assumes the role of a DHCP relay agent. This switch or router uses its own IP address as the relay IP address in forwarding the DHCP request to the DHCP server 452. By handling of DHCP messages over unnumbered interfaces and dynamically assuming the DHCP relay agent role to facilitate a downstream node to acquire its own IP address, the IP network 450 is built with a single subnet. Consequently, IP address management for the IP network 450 is simplified, efficient use of IP address space is achieved, and zero-configuration of the IP network 450 is achieved. Specifically, the switch or router 456-1 relays the DHCP request of the switch or router 456-2 to the DHCP server 452 using its own IP address as the relay IP address, and thus the switch or router 456-2 is able to acquire its IP address from the same subnet as the switch or router 456-1. The switch or router 456-1 relays the DHCP request of the switch or router 456-3 to the DHCP server 452 using its own IP address as the relay IP address, and thus the switch or router 456-3 is able to acquire its IP address from the same subnet as the switch or router 456-1. The switch or router 456-2 or 456-3 cannot forward the DHCP request from the switch or router 456-4 until the switch or router 456-2 or 456-3 has acquired its own IP address. Once the switch or routers 456-2 or 456-3 acquires its own IP address, the switch or router 456-2 or 456-3 acts as the DHCP relay agent for the switch or router 456-4. For example, the switch or router 456-1 has an IP address of 10.1.40.1/24 and uses its IP address of 10.1.40.1/24 as the relay IP address to relay the DHCP request of each switch or router 456-2 or 456-3. As a result, the switch or router 456-2 obtains an IP address of 10.1.40.2/24 and the switch or router 456-3 obtains an IP address of 10.1.40.3/24. The switch or router 456-2 or 456-3 acts as the DHCP relay agent for the switch or router 456-4 and uses its IP address of 10.1.40.2/24 or 10.1.40.3/24 as the relay IP address to relay the DHCP request of the switch or router 456-4. As a result, the switch or router 456-4 obtains an IP address of 10.1.40.4/24. The switches or routers 456-1, 456-2, 456-3, 456-4 are all within the same IP subnet. Although specific IP addresses are described, the IP addresses for the switches or routers 456-1, 456-2, 456-3, 456-4 are not limited to the examples described. In some embodiments, once a specific switch or router acquires its IP address from a neighbor switch or router acting as a relay agent (also referred to as the relay agent router or switch), the relay agent router and the specific switch or router establish peer routing using a dynamic routing protocol, such as, an OSPF protocol or other routing protocol, to propagate various routes across the IP network 450 for full reachability. For example, for the DHCP message of the switch or router 456-2 to reach the DHCP server 452, the switch or router 456-1 must propagate the DHCP server IP address to the switch or router 456-2. By establish peer routing between the switch or router 456-1 and the switch or router 456-2 using a dynamic routing protocol, such as, an OSPF protocol, the switch or router 456-1 can propagate the DHCP server IP address to the switch or router 456-2 through peer routing between the switch or router 456-1 and the switch or router 456-2.

Turning back to the network 350 depicted in FIG. 3, in some embodiments, the DSs 352-1, 352-2, the HEs 354-1, 354-2, the ASs 356-1, 356-2, 356-3, 356-4, 356-5, 356-6, 356-7, 356-8, and the wireless APs 360-1, 360-2, 360-3, 360-4, 360-5, 360-6 are located in the same subnet, the wireless sensors 362-1, 362-2, 362-3 are located in another subnet, and the network devices 364-1, 364-2, 364-3 are located in another subnet. For example, the DS 352-1 has an IP address of 10.1.40.2/24 and uses its IP address of 10.1.40.2/24 as the relay IP address to relay the DHCP request of other network element (e.g., the HE 354-1 or the AS 356-1 or 356-5), while the DS 352-2 has an IP address of 10.1.40.3/24 and uses its IP address of 10.1.40.3/24 as the relay IP address to relay the DHCP request of other network element (e.g., the HE 354-2 or the AS 356-1 or 356-5). As a result, the HE 354-1 obtains an IP address of 10.1.40.4/24 and the HE 354-2 obtains an IP address of 10.1.40.5/24. The AS 356-1 obtains an IP address of 10.1.40.11/24 and the AS 356-5 obtains an IP address of 10.1.40.15/24. The AS 356-1 or 356-5 acts as the DHCP relay agent for other AS and uses its IP address of 10.1.40.11/24 or 10.1.40.15/24 as the relay IP address to relay the DHCP request of the other AS. As a result, the AS 356-2 obtains an IP address of 10.1.40.12/24, the AS 356-4 obtains an IP address of 10.1.40.14/24, the AS 356-6 obtains an IP address of 10.1.40.16/24, and the AS 356-8 obtains an IP address of 10.1.40.18/24. Similarly, using other AS as the relay agent, the AS 356-3 obtains an IP address of 10.1.40.13/24 and the AS 356-7 obtains an IP address of 10.1.40.17/24. Similarly, using an AS as the relay agent, the wireless AP 360-1 obtains an IP address of 10.1.40.21/24, the wireless AP 360-2 obtains an IP address of 10.1.40.22/24, the wireless AP 360-3 obtains an IP address of 10.1.40.23/24, the wireless AP 360-4 obtains an IP address of 10.1.40.24/24, the wireless AP 360-5 obtains an IP address of 10.1.40.25/24, and the wireless AP 360-6 obtains an IP address of 10.1.40.26/24. The DSs 352-1, 352-2, the HEs 354-1, 354-2, the ASs 356-1, 356-2, 356-3, 356-4, 356-5, 356-6, 356-7, 356-8, and the wireless APs 360-1, 360-2, 360-3, 360-4, 360-5, 360-6 are located in the same subnet. The wireless sensor 362-1 obtains an IP address of 10.1.41.1/24, the wireless sensor 362-2 obtains an IP address of 10.1.41.2/24, and the wireless sensor 362-3 obtains an IP address of 10.1.41.3/24. The wireless sensors 362-1, 362-2, 362-3 are located in the same subnet. The network device 364-1 obtains an IP address of 10.1.42.1/24, the network device 364-2 obtains an IP address of 10.1.42.2/24, and the network device 364-3 obtains an IP address of 10.1.42.3/24. The network devices 364-1, 364-2, 364-3 are located in the same subnet. Although specific IP addresses are described, the IP addresses for the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and the network devices 364-1, 364-2, 364-3 are not limited to the examples described.

Figure 5:
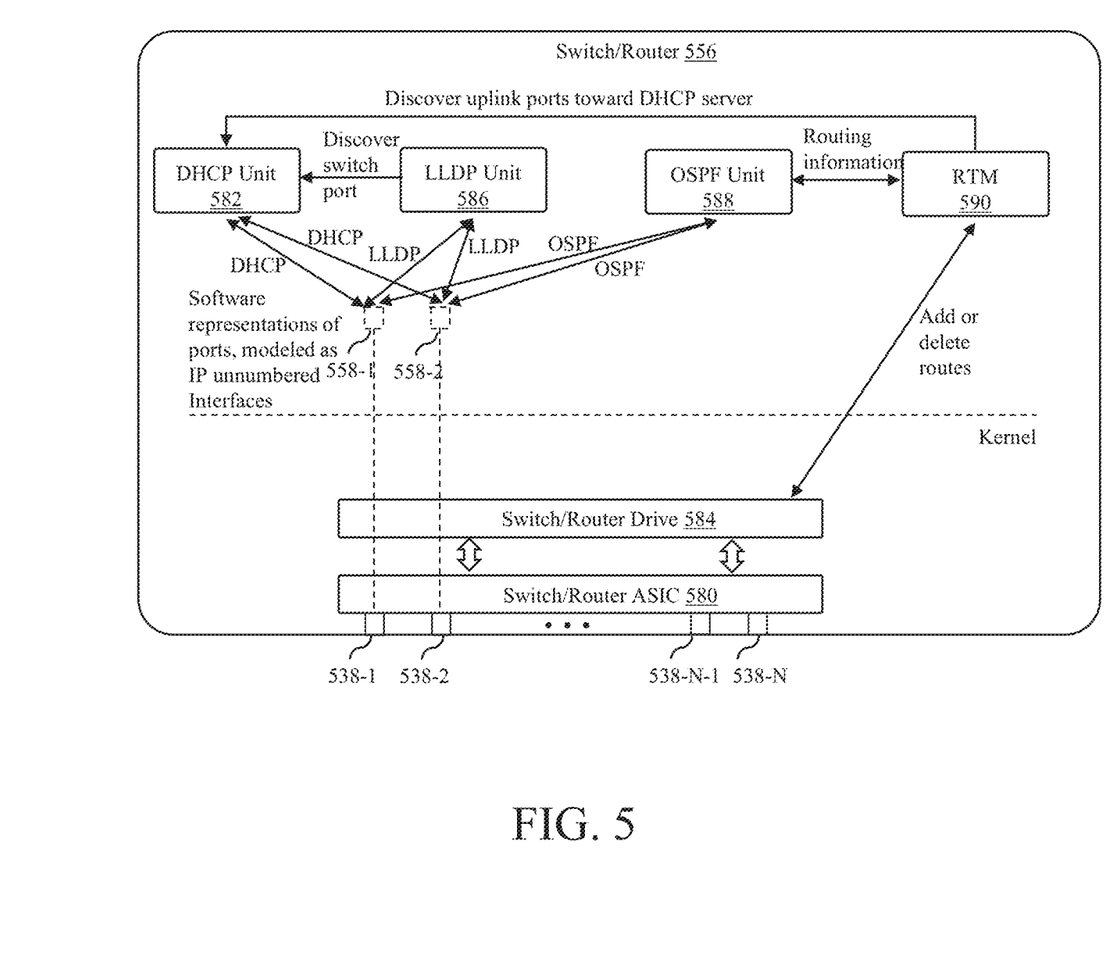
FIG. 5 depicts an embodiment of a switch or router that can be included in the IP network depicted in FIG. 4.

FIG. 5 depicts an embodiment of a switch or router 556 that can be included in the IP network 450 depicted in FIG. 4. The switch or router 556 is an embodiment of the switches or routers 456-1, 456-2, 456-3, 456-4 of the IP network 450 depicted in FIG. 4. However, the switches or routers 456-1, 456-2, 456-3, 456-4 of the IP network 450 depicted in FIG. 4 are not limited to the embodiment depicted in FIG. 5. In the embodiment depicted in FIG. 5, the switch or router 556 includes one or more network ports 538-1, . . . , 538-N (N is a positive integer) that can be connected to other network element(s), such as, a switch (e.g., an AS or an DS) or a router, a switch or router application-specific integrated circuit (ASIC) 580, a switch or router driver 584, a DHCP unit 582, an LLDP unit 586, an OSPF unit 588, and a routing table manager (RTM) 590. The switch or router ASIC 580 and the switch or router driver 584 may form the kernel of the switch or router 556. The switch or router driver 584, the DHCP unit 582, the LLDP unit 586, the OSPF unit 588, and/or the RTM 590 may be implemented in hardware (e.g., circuits), software, firmware, or a combination thereof. In some embodiments, the switch or router driver 584, the DHCP unit 582, the LLDP unit 586, the OSPF unit 588, and/or the RTM 590 includes or is implemented using a processor (e.g., a microcontroller, a DSP, and/or a CPU) configured to execute network functions, and memory that may store information (e.g., an OS) for the processor. For example, at least one of the switch or router driver 584, the DHCP unit 582, the LLDP unit 586, the OSPF unit 588, and the RTM 590 is a software module that executes in a processor. Although the switch or router 556 is shown in FIG. 5 with certain components and described with certain functionality herein, other embodiments of the switch or router 556 may include fewer or more components to implement the same, less, or more functionality. For example, in some embodiments, the switch or router 556 includes memory, such as, DRAM, or flash.

In the embodiment depicted in FIG. 5, the network ports 538-1, . . . 538-N may be any suitable type of port. For example, the network ports 538-1, . . . , 538-N may be LAN network ports such as Ethernet ports. However, the network ports are not limited to LAN network ports. In the embodiment depicted in FIG. 5, the switch or router ASIC 580 is configured to perform switch and/or routing functions. In the embodiment depicted in FIG. 5, the switch or router driver 584 is configured to control the DHCP unit 582, the LLDP unit 586, the OSPF unit 588, and/or the RTM 590.

In the embodiment depicted in FIG. 5, the DHCP unit 582 is configured to perform DHCP functions. For example, the DHCP unit 582 may act as a DHCP client to communicate with the DHCP server 452 depicted in FIG. 4 and/or a DHCP relay agent between the DHCP server 452 and another network element (e.g., a switch or router) to relay messages between the DHCP server 452 and the another network element. In some embodiments, the DHCP unit 582 communicates with virtual or logical network ports, for example, virtual or logical network ports 558-1, 558-2 of the physical network ports 538-1, 538-2, which may be software representations of physical network ports 538-1, 538-2 that are modeled as IP unnumbered interfaces without specifically assigned IP addresses, to exchange DHCP messages.

In the embodiment depicted in FIG. 5, the LLDP unit 586 is configured to perform LLDP functions. For example, the LLDP unit 586 may discover network ports for and/or from the DHCP unit 582. In some embodiments, the LLDP unit 586 communicates with virtual or logical network ports, for example, virtual or logical network ports 558-1, 558-2 of the physical network ports 538-1, 538-2, to exchange LLDP messages. In the embodiment depicted in FIG. 5, the OSPF unit 588 is configured to perform OSPF functions. In some embodiments, the OSPF unit 588 communicates with virtual or logical network ports, for example, virtual or logical network ports 558-1, 558-2 of the physical network ports 538-1, 538-2, to exchange OSPF messages. In the embodiment depicted in FIG. 5, the RTM 590 is configured to perform routing table management functions. In some embodiments, the RTM 590 may exchange routing information with the OSPF unit 588. In some embodiments, the RTM 590 may discover uplink ports toward a DHCP server (e.g., the DHCP server 452).

Figure 6:
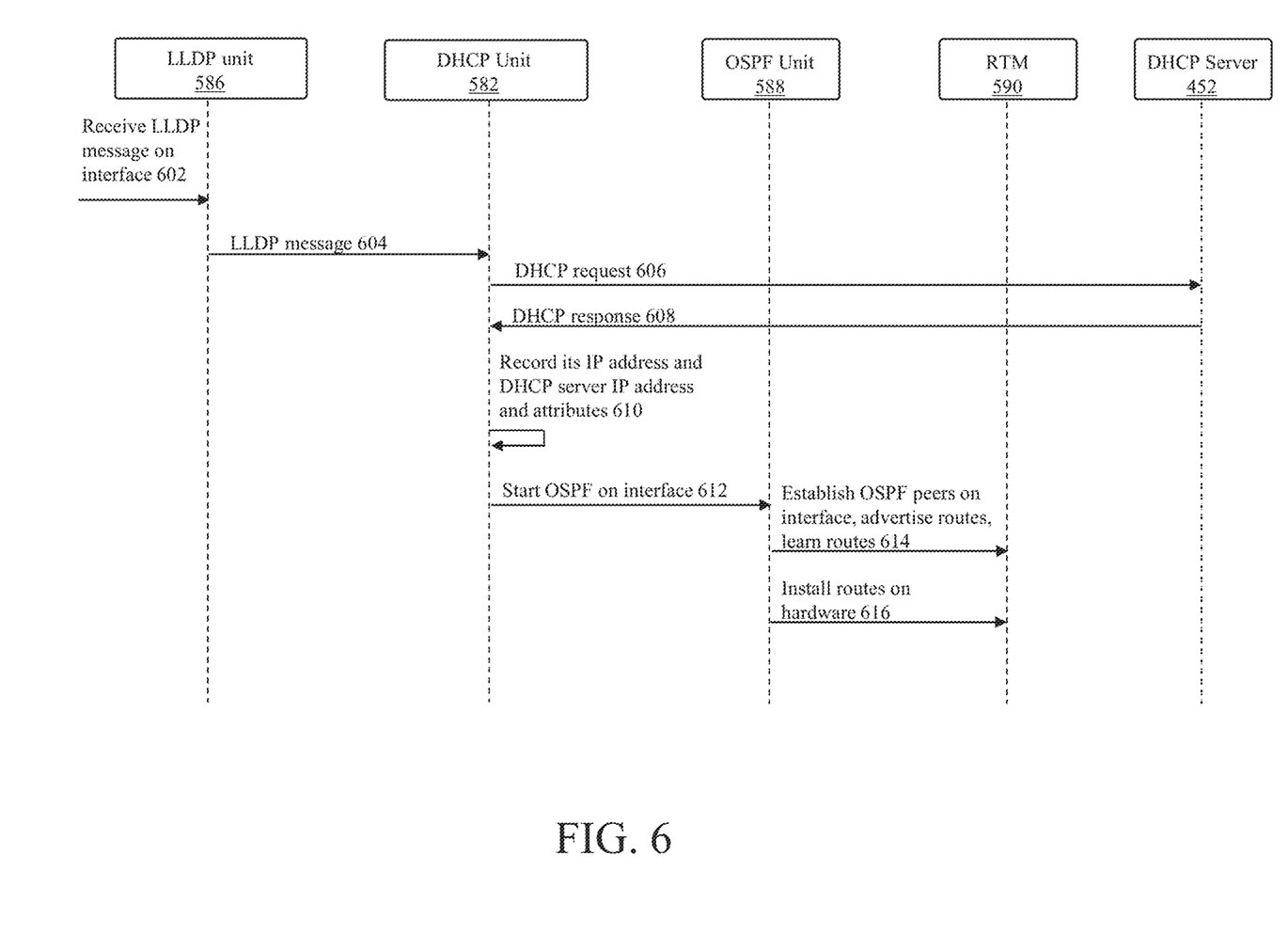
FIG. 6 shows a swim-lane diagram illustrating an example IP address obtaining procedure of the switch or router depicted in FIG. 5.

FIG. 6 shows a swim-lane diagram illustrating an example IP address obtaining procedure of the switch or router 556 depicted in FIG. 5, which involves the LLDP unit 586, the DHCP unit 582, the OSPF unit 588, and the RTM 590 of the switch or router 556 depicted in FIG. 5 and the DHCP server 452 depicted in FIG. 4. Although operations in the example procedure in FIG. 6 are described in a particular order, in some embodiments, the order of the operations in the example procedure may be altered so that certain operations may be performed in an inverse order or so that certain operations may be performed, at least in part, concurrently with other operations. At operation 602, an LLDP message is received by the LLDP unit 586 through an interface. At operation 604, the LLDP message is sent to the DHCP unit 582. Subsequently, DHCP communications (e.g., DHCP discovery, DHCP offer, DHCP request, and DHCP acknowledgement) between the DHCP unit 582 and the DHCP server 452 are conducted. At operation 606, a DHCP request is sent from the DHCP unit 582 to the DHCP server 452. At operation 608, a DHCP response is sent from the DHCP server 452 to the DHCP unit 582. At operation 610, the DHCP unit 582 records or stores its IP address and the IP address and attributes of the DHCP server 452. At operation 612, the DHCP unit 582 starts OSPF service on a network interface (e.g., an unnumbed interface). At operation 614, the OSPF unit 588 establishes OSPF peers on the network interface, advertises routes, and learns routes, for example, through the ATM 490. At operation 616, the OSPF unit 588 install routes on hardware (e.g., the RTM 590).

Figure 7:
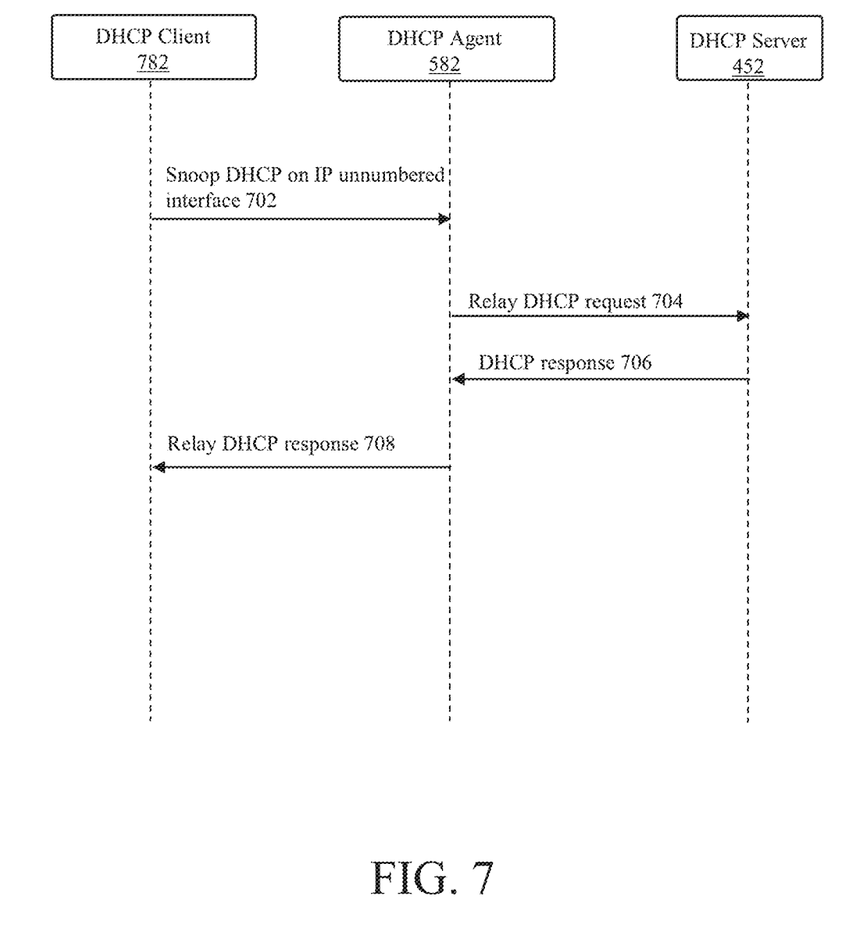
FIG. 7 shows a swim-lane diagram illustrating an example DHCP procedure.

FIG. 7 shows a swim-lane diagram illustrating an example DHCP procedure, which involves a DHCP client 782, the DHCP unit 482 of the switch or router 556 depicted in FIG. 5, and the DHCP server 452 depicted in FIG. 4. The DHCP client 782 may be a component of a network element, for example, a switch or router (e.g., the routers or switches 456-2, 456-3, 456-4 depicted in FIG. 4). Although operations in the example procedure in FIG. 7 are described in a particular order, in some embodiments, the order of the operations in the example procedure may be altered so that certain operations may be performed in an inverse order or so that certain operations may be performed, at least in part, concurrently with other operations. At operation 702, the DHCP client 782 of another switch or router snoops DHCP on an IP unnumbered interface of the switch or router 556 depicted in FIG. 5, for example, by sending a DHCP request to the DHCP unit 482. At operation 704, the DHCP request is relayed to the DHCP server 452 by the DHCP unit 482. At operation 706, a DHCP request response is sent from the DHCP server 452 to the DHCP unit 482. At operation 708, the DHCP response is relayed to the DHCP client 782 by the DHCP unit 482 through the IP unnumbered interface of the switch or router 556.

Figure 8:
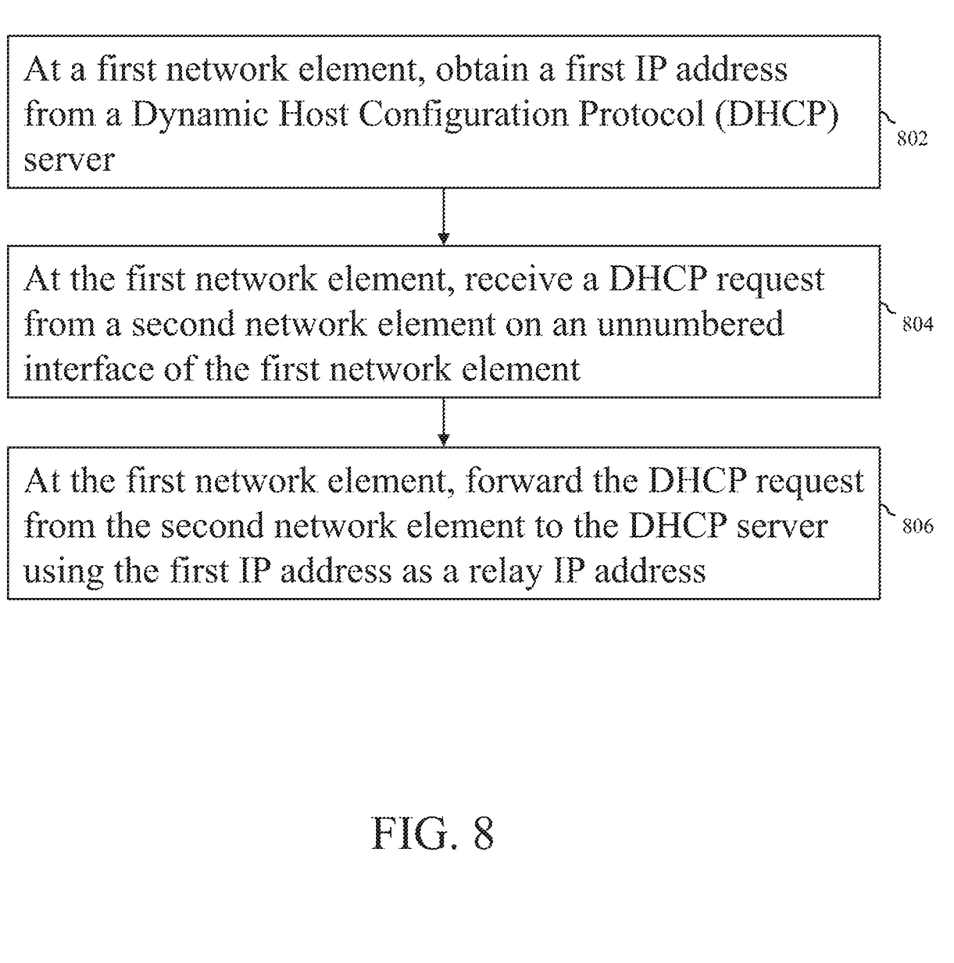
FIG. 8 is a process flow diagram of a method for automatically building an IP network in accordance to an embodiment of the invention.

FIG. 8 is a process flow diagram of a method for automatically building an internet protocol (IP) network in accordance to an embodiment of the invention. According to the method, at block 802, at a first network element, a first IP address is obtained from a Dynamic Host Configuration Protocol (DHCP) server. At block 804, at the first network element, a DHCP request is received from a second network element on an unnumbered interface of the first network element. At block 806, at the first network element, the DHCP request from the second network element is forwarded to the DHCP server using the first IP address as a relay IP address. In some embodiments, at the first network element, a DHCP response is received from the DHCP server, where the DHCP response contains a second IP address of the second network element, and at the first network element, the DHCP response from the DHCP server is forwarded to the second network element through the unnumbered interface of the first network element. In some embodiments, the first and second IP addresses have an identical subnet mask. In some embodiments, the first and second network elements are switches or routers. In some embodiments, peer routing is established between the first network element and the second network element using a routing protocol after the second network element acquires the second IP address based on the DHCP response. In some embodiments, the routing protocol includes an Open Shortest Path First (OSPF) protocol. In some embodiments, at the first network element, a server IP address of the DHCP server is recorded or stored. In some embodiments, the first and second network elements include at least one distribution switch (DS). In some embodiments, the first and second network elements include e at least one access switch (AS). In some embodiments, the first and second network elements include a DS and an AS. In some embodiments, the first and second network elements comprise at least one wireless access point (AP). The first network element may be similar to, the same as, or a component of the network devices 104-1, . . . , 104-N depicted in FIG. 1, the network device 204 depicted in FIG. 2, the DSs 352-1, 352-2, the ASs 356-1, 356-2, 356-3, 356-4, 356-5, 356-6, 356-7, 356-8, the wireless APs 360-1, 360-2, 360-3, 360-4, 360-5, 360-6 depicted in FIG. 3, the routers or switches 456-1, 456-2, 456-3 depicted in FIG. 4, and/or the switch or router 556 depicted in FIG. 5. The second network element may be similar to, the same as, or a component of the network devices 104-1, . . . , 104-N depicted in FIG. 1, the network device 204 depicted in FIG. 2, the DSs 352-1, 352-2, the ASs 356-1, 356-2, 356-3, 356-4, 356-5, 356-6, 356-7, 356-8, the wireless APs 360-1, 360-2, 360-3, 360-4, 360-5, 360-6 depicted in FIG. 3, the routers or switches 456-2, 456-3, 456-4 depicted in FIG. 4, and/or the switch or router 556 depicted in FIG. 5. The DHCP server may be similar to, the same as, or a component of the DHCP server 452 depicted in FIG. 4. The DS may be similar to, the same as, or a component of the DSs 352-1, 352-2 depicted in FIG. 3. The AS may be similar to, the same as, or a component of the ASs 356-1, 356-2, 356-3, 356-4, 356-5, 356-6, 356-7, 356-8 depicted in FIG. 3. The wireless AP may be similar to, the same as, or a component of the wireless APs 360-1, 360-2, 360-3, 360-4, 360-5, 360-6 depicted in FIG. 3.

Figure 9:
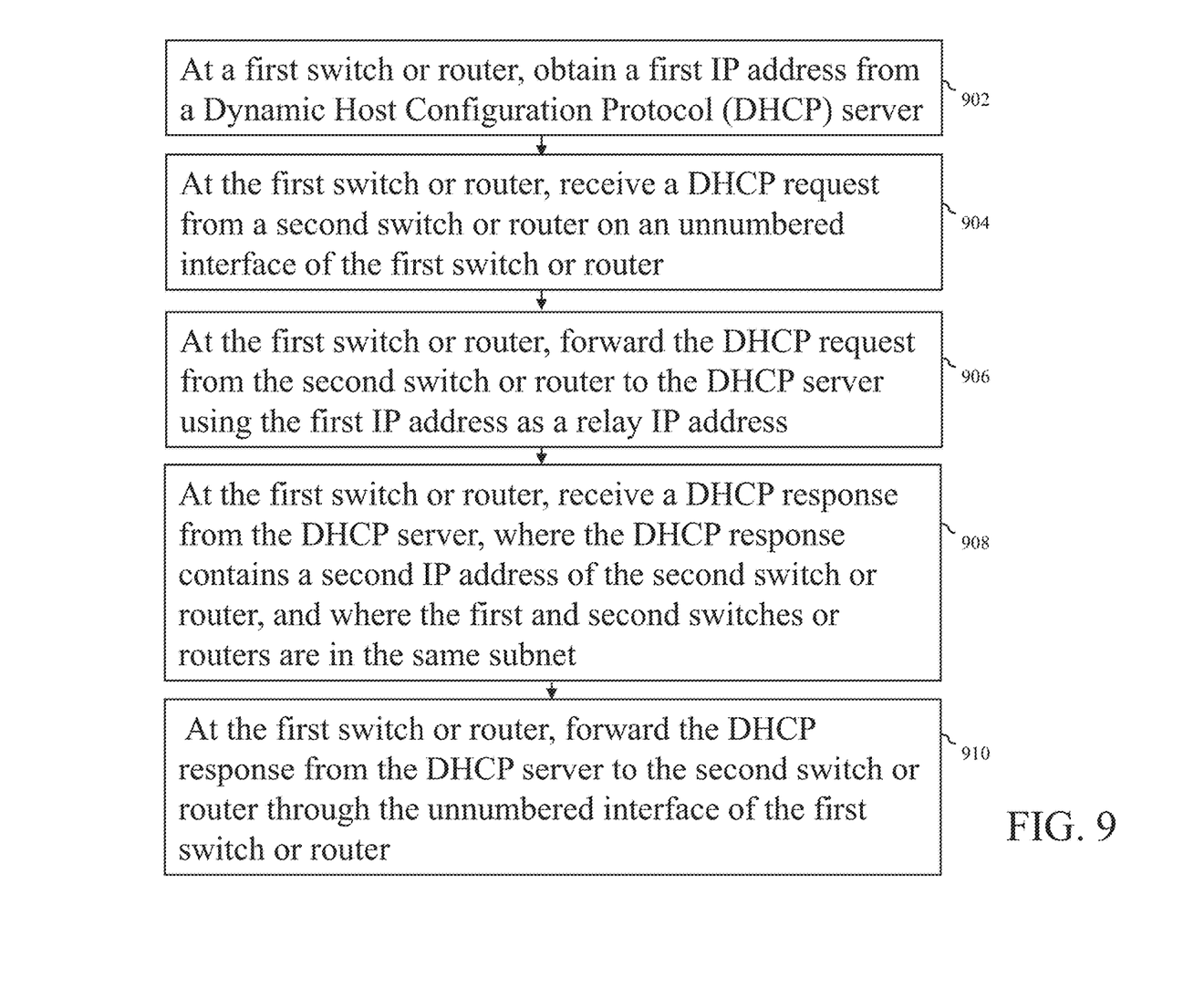
FIG. 9 is a process flow diagram of a method for automatically building an IP network in accordance to an embodiment of the invention.

FIG. 9 is a process flow diagram of a method for automatically building an IP network in accordance to an embodiment of the invention. According to the method, at block 902, at a first switch or router, a first IP address is obtained from a Dynamic Host Configuration Protocol (DHCP) server. At block 904, at the first switch or router, a DHCP request is received from a second switch or router on an unnumbered interface of the first switch or router. At block 906, at the first switch or router, the DHCP request from the second switch or router is forwarded to the DHCP server using the first IP address as a relay IP address. At block 908, at the first switch or router, a DHCP response is received from the DHCP server, where the DHCP response contains a second IP address of the second switch or router, and where the first and second switches or routers are in the same subnet (e.g., the first and second IP addresses have the identical subnet mask). At block 910, at the first switch or router, the DHCP response from the DHCP server is forwarded to the second switch or router through the unnumbered interface of the first switch or router. In some embodiments, peer routing is established between the first switch or router and the second switch or router using a routing protocol after the second switch or router acquires the second IP address based on the DHCP response. In some embodiments, the routing protocol includes an Open Shortest Path First (OSPF) protocol. In some embodiments, at the first switch or router, a server IP address of the DHCP server is recorded or stored. In some embodiments, the first and second switches or routers include at least one distribution switch (DS). In some embodiments, the first and second switches or routers include at least one access switch (AS). In some embodiments, the first and second switches or routers include a DS and an AS. The first switch or router may be similar to, the same as, or a component of the DSs 352-1, 352-2, the ASs 356-1, 356-2, 356-3, 356-4, 356-5, 356-6, 356-7, 356-8, the switches or routers 456-1, 456-2, 456-3 depicted in FIG. 4, and/or the switch or router 556 depicted in FIG. 5. The second switch or router may be similar to, the same as, or a component of the DSs 352-1, 352-2, the ASs 356-1, 356-2, 356-3, 356-4, 356-5, 356-6, 356-7, 356-8, the switches or routers 456-2, 456-3, 456-4 depicted in FIG. 4, and/or the switch or router 556 depicted in FIG. 5. The DHCP server may be similar to, the same as, or a component of the DHCP server 452 depicted in FIG. 4. The DS may be similar to, the same as, or a component of the DSs 352-1, 352-2 depicted in FIG. 3. The AS may be similar to, the same as, or a component of the ASs 356-1, 356-2, 356-3, 356-4, 356-5, 356-6, 356-7, 356-8 depicted in FIG. 3.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatically building an internet protocol (IP) network, the method comprising:
    at a first network element, obtaining a first IP address from a Dynamic Host Configuration Protocol (DHCP) server;
    on an unnumbered interface of the first network element, receiving a DHCP request from an unnumbered interface of a second network element, wherein each of the unnumbered interface of the second network element and the unnumbered interface of the first network element comprises an unnumbered logical or virtual interface, wherein IP processing is enabled on the unnumbered logical or virtual interface without assigning an explicit IP address to the unnumbered logical or virtual interface, wherein the first network element, the second network element, and at least one other network element are connected in series through a plurality of unnumbered interfaces to form a circle, and wherein all network interfaces of the second network element are unnumbered interfaces;
    at the first network element, forwarding the DHCP request from the second network element to the DHCP server using the first IP address as a relay IP address;
    at the first network element, receiving a DHCP response from the DHCP server, wherein the DHCP response contains a second IP address of the second network element, and wherein the first and second network elements are in the same subnet, and wherein the first and second IP addresses have an identical subnet mask; and
    at the first network element, forwarding the DHCP response to the second network element through the unnumbered interface of the first network element and the unnumbered interface of the second network element.

2. The method of claim 1, further comprising:
    establishing peer routing between the first network element and the second network element using a routing protocol after the second network element acquires the second IP address based on the DHCP response.

3. The method of claim 2, wherein the routing protocol comprises an Open Shortest Path First (OSPF) protocol.

4. The method of claim 1, wherein at the first network element, obtaining the first IP address from the DHCP server comprises at the first network element, recording a server IP address of the DHCP server.

5. The method of claim 1, wherein the first and second network elements are switches or routers.

6. The method of claim 1, wherein the first and second network elements comprise at least one distribution switch (DS).

7. The method of claim 1, wherein the first and second network elements comprise at least one access switch (AS).

8. The method of claim 1, wherein the first and second network elements comprise a distribution switch (DS) and an access switch (AS).

9. The method of claim 1, wherein the first and second network elements comprise at least one wireless access point (AP).

10. A method for automatically building an internet protocol (IP) network, the method comprising:
    at a first switch or router, obtaining a first IP address from a Dynamic Host Configuration Protocol (DHCP) server;
    on an unnumbered interface of the first switch or router, receiving a DHCP request from an unnumbered interface of a second switch or router, wherein each of the unnumbered interface of the second switch or router and the unnumbered interface of the first switch or router comprises an unnumbered logical or virtual interface, and wherein IP processing is enabled on the unnumbered logical or virtual interface without assigning an explicit IP address to the unnumbered logical or virtual interface, wherein the first switch or router, the second switch or router, and at least one other switch or router are connected in series through a plurality of unnumbered interfaces to form a circle, wherein all network interfaces of the second switch or router are unnumbered interfaces;
    at the first switch or router, forwarding the DHCP request from the second switch or router to the DHCP server using the first IP address as a relay IP address;
    at the first switch or router, receiving a DHCP response from the DHCP server, wherein the DHCP response contains a second IP address of the second switch or router, and wherein the first and second switches or routers are in the same subnet, and wherein the first and second IP addresses have an identical subnet mask; and
    at the first switch or router, forwarding the DHCP response from the DHCP server to the second switch or router through the unnumbered interface of the first switch or router and the unnumbered interface of the second switch or router.

11. The method of claim 10, further comprising:
    establishing peer routing between the first switch or router and the second switch or router using a routing protocol after the second switch or router acquires the second IP address based on the DHCP response.

12. The method of claim 11, wherein the routing protocol comprises an Open Shortest Path First (OSPF) protocol.

13. The method of claim 10, wherein at the first switch or router, obtaining the first IP address from the DHCP server comprises at the first switch or router, recording a server IP address of the DHCP server.

14. The method of claim 10, wherein the first and second switches or routers comprise at least one distribution switch (DS).

15. The method of claim 10, wherein the first and second switches or routers comprise at least one access switch (AS).

16. The method of claim 10, wherein the first and second switches or routers comprise a distribution switch (DS) and an access switch (AS).

17. A network element, the network element comprising:
memory; and
one or more processors configured to:
- obtain a first IP address from a DHCP server;
- on an unnumbered interface of the network element, receive a DHCP request from an unnumbered interface of a second network element, wherein each of the unnumbered interface of the second network element and the unnumbered interface of the network element comprises an unnumbered logical or virtual interface, wherein IP processing is enabled on the unnumbered logical or virtual interface without assigning an explicit IP address to the unnumbered logical or virtual interface, wherein the network element, the second network element, and at least one other network element are connected in series through a plurality of unnumbered interfaces to form a circle, and wherein all network interfaces of the second network element are unnumbered interfaces;
- forward the DHCP request from the second network element to the DHCP server using the first IP address as a relay IP address;
- receive a DHCP response from the DHCP server, wherein the DHCP response contains a second IP address of the second network element, and wherein the first and second IP addresses have an identical subnet mask; and
- forward the DHCP response from the DHCP server to the second network element through the unnumbered interface of the network element and the unnumbered interface of the second network element.

\* \* \* \* \*